US006559233B2

United States Patent
Bavouzet et al.

(10) Patent No.: US 6,559,233 B2
(45) Date of Patent: May 6, 2003

(54) COMPOSITION COMPRISING A COPOLYMER AT LEAST TWO CHARGED BLOCKS AND TYPE OF OPPOSITE CHARGE

(75) Inventors: Bruno Bavouzet, Paris (FR); Mathias Destarac, Paris (FR); Pascal Herve, West Windsor, NJ (US); Daniel Taton, Bordeaux (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/904,947

(22) Filed: Jul. 13, 2001

(65) Prior Publication Data

US 2003/0023000 A1 Jan. 30, 2003

(51) Int. Cl.⁷ .......................... C08L 53/00; C08F 293/00
(52) U.S. Cl. ............................ 525/244; 525/71; 525/89; 525/280; 525/299; 525/312
(58) Field of Search .......................... 525/244, 71, 89, 525/280, 299, 312

(56) References Cited

U.S. PATENT DOCUMENTS 5,632,998 A * 5/1997 Midha et al.
6,096,697 A * 8/2000 Wells .......................... 510/127

* cited by examiner

Primary Examiner—James J. Seidleck
Assistant Examiner—Olga Asinovsky

(57) ABSTRACT

A subject of the present invention is an aqueous composition combining at least one block copolymer (A) comprising, in the pH and temperature conditions of the composition, at least two polyionic blocks of the same charge and at least one non-charged block, with at least one ionic or polyionic (B) type with an opposite charge to that of the said polyionic blocks, in the pH conditions of the composition; type (B) being chosen from among ions carrying at least two charges, surfactants carrying at least one charge, oligomers and/or polymers carrying at least two charges and/or mineral particles carrying at least two charges; the block copolymer (A) content being such that the viscosity of the composition is at least greater than three times that of an aqueous solution of block copolymer (A) and to that of an aqueous solution of type (B), in the same temperature, pH and concentration conditions.

The present composition, before its use or during its use, is in the form of a gel.

32 Claims, No Drawings

COMPOSITION COMPRISING A COPOLYMER AT LEAST TWO CHARGED BLOCKS AND TYPE OF OPPOSITE CHARGE

A subject of the present invention is an aqueous composition comprising a block copolymer carrying at least two blocks of the same charge, combined with at least one ionic type carrying one or more charges opposite to those carried by the copolymer.

More particularly, the aqueous composition is found either in the form of a gel, or in the form of a viscous fluid.

In many fields, control of the rheology of formulas in variable conditions, pH and temperature for example is sought. To this end, there are various methods such as for example the structured phases of surfactants, and polymer dispersions.

The subject of the present invention more precisely relates to the field of compositions with a high viscosity and/or a high elasticity characteristic of gelatinous compositions, because of electrostatic interactions between the types present.

However, this type of composition remains very little developed, one of the main reasons being due to the fact that they exist only in very specific and relatively limited conditions. For example, and in the majority of cases, the said compositions are obtained only for precise combinations of compounds. In fact, the mixture of two different types of opposite charge often leads to a macroscopic separation of phases, resulting from the strong electrostatic combination of the types. Moreover, the conditions in which this type of drawback is not seen, and in which interesting and exploitable rheological properties are obtained, are also limited. In fact, such favourable conditions are found most of the time in a limited zone of the phase diagram and frequently not far from a biphasic region. Consequently, during the use of this type of system, the changing of certain parameters, caused for example by a dilution, can be such that the system tends towards an undesirable macroscopic separation of phases. A destabilization of the gel and the loss of the expected rheological properties are then often observed.

An aim of the present invention is therefore to propose compositions with a relatively high viscosity and/or gel properties, originating in the electrostatic interactions between the various elements constituting the said composition.

Moreover another aim of the invention is to propose compositions in which the above mentioned characteristics can be observed not only for a large range of compounds but also in a wide range of concentrations.

These aims and others are achieved by the present invention, a subject of which is thus an aqueous composition combining at least one block copolymer (A) comprising, in the pH conditions of the composition, at least two polyionic blocks of the same charge and at least one non-charged block, with at least one ionic or polyionic (B) type with a charge opposite to that of the said polyionic blocks, in the pH conditions of the composition; type (B) being chosen from ions carrying at least two charges, surfactants carrying at least one charge, oligomers and/or polymers carrying at least two charges and/or mineral particles carrying at least two charges: the block copolymer (A) content being such that the viscosity of the composition is at least greater than three times, preferably greater than or equal to ten times that of an aqueous solution of block copolymer (A) and to that of an aqueous solution of type (B), in the same conditions of temperature and concentration.

As already indicated above, the compositions according to the invention have the advantage, amongst others, of allowing access to electrostatic gels by using numerous compounds, in wide ranges of concentration.

Moreover, the compositions according to the invention are relatively insensitive to outside factors such as temperature.

Such a property makes the compositions according to the invention particularly suitable for applications in the field of exploration of oil or gas deposits, in particular as an additive in the composition of drilling fluids. In fact, the temperatures encountered most of the time in these applications are high and many additives used as thickening agents lose their capacity to thicken in such conditions, unlike the compositions according to the invention.

Moreover, the compositions according to the invention, in some cases, can also substantially preserve their high viscosity, as well as their gel characteristics where appropriate, even with the addition of hydrophobic compounds.

According to another characteristic of the compounds according to the invention, sensitivity to pH can be adapted as required, according to the nature of the charged units present on the corresponding blocks of the copolymer. In fact, if the units comprise a weak acid or a base, their charge varies according to the pH of the medium. This can represent a significant advantage where it is desired to develop the rheological characteristics of the composition in relation to this parameter (gel which can be stimulated by pH—pH responsive gels). For example in some applications it may be advantageous to have available agents acting almost instantaneously which make it possible to destructure a jellified composition or indeed on the contrary to jellify the composition.

Moreover, the present invention makes it possible to jellify and/or thicken compositions comprising cationic types, which is difficult for many standard thickeners. In fact the latter are in the majority of cases anionic compounds. When the latter are in contact with the said cationic types, a precipitation of the whole is generally observed.

But other advantages and characteristics of the present invention will appear more clearly from reading the description and examples which follow.

It is to be noted that the aqueous composition according to the invention may be presented in the form of a gel. By gel is more precisely meant compositions which have an elastic modulus (G') greater than or equal to the loss modules (G") over a frequency range between 1 and 10 Hz, with a geometry of cone plate type; the modules being measured in the linear visco-elastic system, at 25° C., with a Rheometrics or Carrimed rheometer.

In addition, in the following, the temperature and pH conditions of the composition relate to the composition as it was before its use, whether it comprises only the copolymer and the charged type, or whether it is combined with various other constituents necessary for obtaining complete formulations. These "conditions" can also relate to the composition during its use, more specifically during use of the complete formulation.

As has already been mentioned above, the first type of element constituting the composition according to the invention consists of one or more block copolymers (A) comprising, in the pH conditions of the composition, at least two polyionic blocks of the same charge and at least one non-charged block.

More particularly, the block copolymer (A) is chosen from among linear block copolymers, block copolymers with a comb structure, star structure or dendrimeric (hyperbranched) structure.

The linear block copolymers more particularly have a structure comprising at least three blocks. Preferably, the copolymers are copolymers comprising three blocks (triblocks).

The block copolymers with a comb structure preferably have a non-charged skeleton onto which charged segments are grafted. It is to be noted that other combinations are possible as soon as the copolymer has at least two charged blocks and at least one non-charged block.

As far as block copolymers with a star structure are concerned, several possibilities can be envisaged. According to a particular embodiment, if each arm of the star is considered, it can comprise either a block copolymer, preferably a diblock, of which one is charged and the other is not: or a homopolymer, charged or not. Whatever the variant adapted, the choice of blocks is such that the copolymer has at least two charged blocks and at least one non-charged block.

It is emphasized that the copolymer used in the present invention comprises a sum of blocks (fragments) containing at least five monomer repetition blocks. Moreover, these blocks are such that there are at least two blocks the chemical composition of which is different. By different chemical composition is more particularly meant that the chemical nature of at least one of the monomers is different from one block to another, and/or that the respective proportions of the monomers are different from one block to another. Finally, the said fragments can be found in the main chain of the polymer, or in the side chains (grafts) or in the branches (in the case of star-form polymers). Moreover it is specified that each block can have a distribution of monomers of random type, or have a concentration gradient.

The dendrimeric or hyperbranched copolymers more particularly have an arborescent structure.

A first variant of the invention is constituted by compositions in which the polyionic blocks of the copolymer are anionic blocks in the pH conditions of the composition.

In an advantageous fashion, the monomers from which the blocks are obtained are chosen from among those which remain in an anionic form over a wide pH range between 2 and 14 (strong acids) or which can develop from a neutral form to an anionic form (or conversely) according to the pH range (weak acids). The term anionic will be used subsequently to designate both monomers in an ionic form but also those in a potentially ionisable form.

In an advantageous fashion, the said anionic blocks of the copolymer are obtained from at least one monomer carrying at least one carboxylic, sulphonic, sulphuric, phosphonic, phosphoric or sulfosuccinic function, the corresponding salts, or the corresponding precursors.

More particularly, the anionic blocks of the copolymer are obtained from at least one monomer chosen from among:

linear, branched, cyclic or aromatic mono- or polycarboxylic acids, the N-substituted derivatives of such acids, monoester polycarboxylic acids, comprising at least one ethylenic non-saturation;

linear, branched, cyclic or aromatic vinyl carboxylic acids;

amino acids, comprising at least one ethylenic non-saturation, N-carboxy anhydride amino acids;

on their own or in mixtures, their sulphonic or phosphonic derivatives, macromonomers deriving from such monomers, the salts or the precursors of these monomers. It is emphasized that the term macromonomer designates a macromolecule carrying one or more polymerisable functions.

As examples of monomers likely to be involved in the preparation of anionic blocks of the copolymer, the following can be mentioned without any intention of limitation thereto:

acrylic acid, methacrylic acid, fumaric acid, itaconic acid, citraconic acid, maleic acid, oleic acid, linoleic acid, linolenic acid, glycolic acrylamido acid, 2-propene 1-sulphonic acid, methallyl sulphonic acid, sulphonic styrene acid, α-acrylamido methylpropane sulphonic acid, 2-sulphoethylene methacrylate, acrylic sulphopropyl acid, acrylic bis-sulphopropyl acid, methacrylic sulphatoethyl acid, methacrylic hydroxyethyl acid phosphate monoester, as well as alkaline metal salts, such as sodium, potassium or ammonium;

vinyl sulphonic acid, sulphonic vinylbenzene acid, vinyl phosphonic acid, vinylidene phosphoric acid, vinyl benzoic acid, as well as alkaline metal salts such as sodium, potassium, or ammonium;

N-methacryloyl alanine, N-acryloyl-hydroxy-glycine; on their own or in mixtures, the macromonomers deriving from such monomers, the salts or the precursors of these monomers.

It is to be noted that the scope of the present invention would not be exceeded by using monomers which are precursors of those which have just been mentioned. In other words, these monomers have units which, once incorporated into the polymer chain, can be transformed, in particular by a chemical treatment such as hydrolysis, to give the aforementioned anionic types. For example, the totally or partially esterified monomers of the aforementioned monomers can be used as precursors.

According to another variant of the present invention, the polyionic blocks of the copolymer are cationic blocks in the pH conditions of the composition.

In an advantageous fashion, the monomers from which the blocks are obtained are chosen from among those which are found in a cationic form whatever the pH or which can even develop from a neutral to a cationic form (or the reverse) according to the pH range (weak bases). The term cationic will be subsequently used to designate both monomers in an ionic form but also those in a potentially ionisable form.

More particularly, the said cationic blocks are obtained from at least one monomer chosen from among:

aminoalkyl (meth)acrylates, (meth)aminoalkyl (meth) acrylamides;

monomers comprising at least one secondary, tertiary or quaternary amine function, or a heterocyclic group containing a nitrogen atom, vinylamine or ethylenimine;

diallyldialkyl ammonium salts; on their own or in mixtures, their salts, as well as the macromonomers deriving from such monomers.

When the said monomers are found in an ionised form, more particularly in the form of a quatemary ammonium of $-NR_3^+$ type, in which R, identical or not, represents a hydrogen atom, an alkyl radical comprising 1 to 10 carbon atoms, a benzyl radical, optionally carrying a hydroxyl radical, the counter-ion tan be chosen from among halides such as for example the chlorides, bromides, sulphates, hydrosulphates, alkylsulphates (for example comprising 1 to 6 carbon atoms), phosphates, citrates, formates, acetates.

As examples of cationic monomers likely be involved in the composition of the cationic blocks of the copolymer, the following can be mentioned:

dimethylaminoethyl (meth)acrylate, dimethylaminopropyl (meth)acrylate, ditertiobutylaminoethyl (meth)

acrylate, dimethylaminomethyl (meth)acrylamide, dimethylaminopropyl (meth)acrylamide;

ethylenimine, vinylamine, 2-vinylpyridine, 4-vinylpyridine;

trimethylammonium ethyl (meth)acrylate chloride, trimethylammonium ethyl acrylate methyl sulphate, dimethylammonium ethyl (meth)acrylate benzyl chloride 4-benzoylbenzyl dimethylammonium ethyl acrylate chloride, trimethyl ammonium ethyl (meth)acrylamido chloride, vinylbenzyl trimethyl ammonium chloride;

diallyldimethyl ammonium chloride; on their own or in mixtures, as well as macromonomers deriving from such monomers.

As examples of non-ionic monomers in the pH conditions of the composition, likely to be used in the preparation of the block(s) not charged with the copolymer, the following can be mentioned:

ethylene oxide, propylene oxide, butylene oxide, the esters of mono- or polycarboxylic acids, linear, branched, cyclic or aromatic, comprising at least one ethylenic non-saturation, the amides of mono- or polycarboxylic acid, linear, branched, cyclic or aromatic, comprising at least one ethylenic non-saturation, the $\alpha\beta$-ethylenically unsaturated nitriles, N-vinyl pyrrolidone, vinyl ethers, vinyl esters, vinylaromatic monomers, vinyl or vinylidene halides, vinylamine amides, hydrocarbonated monomers, linear or branched, comprising at least one carbon-carbon double bond, on their own or in mixtures, as well as macromonomers deriving from such monomers.

As particular examples of monomers likely to be involved in the preparation of the non-charged block copolymers, the following can be cited without any intention of limitation thereto:

ethylene oxide;

(meth)acrylic acid esters with an alcohol comprising 1 to 12 carbon atoms such as methyl (meth)acrylate, ethyl (meth)acrylate, propyl (meth)acrylate, n-butyl (meth)acrylate, t-butyl (meth)acrylate, isobutyl (meth)acrylate, 2-ethylhexyl acrylate, hydroxyethyl (meth)acrylate:

vinyl acetate (making it possible to obtain partially or totally deacetylated polyvinyl alcohol), vinyl Versatate®, vinyl propionate, vinyl chloride, vinylidene chloride, methyl vinyl ether, (meth)acrylonitrile, N-vinylpyrrolidone, vinylformamide, vinylacetamide;

(meth)acrylamide, N-alkyl (meth)acrylamides such as isopropyl acrylamide, N-methylol (meth)acrylamide;

styrene, $\alpha$-methyl styrene, vinyl toluene, butadiene, chloroprene;

on their own or in mixtures, as well as the macromonomers deriving from such monomers.

It is also specified that the charged blocks can also contain one or more monomers of non-ionic type. The latter can be distributed within the block in a random manner with the charged monomers or according to a concentration gradient. In the case where the non-ionic monomers are present in the charged blocks, the non-ionic monomers used are preferably chosen from among water-soluble monomers.

According to an advantageous embodiment of the present invention, the non-charged block of the block copolymer is preferably water-soluble, or where appropriate soluble in a solvent/water mixture; the solvent more particularly being an alcohol such as ethanol or isopropanol.

Preferably, the monomer(s) involved in the composition of the non-charged block(s) are chosen in such a way and in such proportions that a composition in water, comprising the block copolymer (A) in solution between 1 and 5% by weight, in the presence of a type (B) in a content such that the molar ratio of the totality of the cationic charges over the totality of the anionic charges is between 0.001 and 1000, more particularly between 0.01 and 100, preferably between 0.1 and 10, at 25° C., has a stable monophasic appearance. More particularly, this stable monophasic state can be observed in equilibrium. Equilibrium is considered to be achieved, in these temperature conditions, after one month. In other words, the said composition displays no macroscopic separation of phases.

According to a more particular embodiment of the invention, each non-charged block of the copolymer has a molar mass by weight at least three times greater than that of at least one of the charged blocks.

Moreover, it is preferable that the proportion of hydrophilic units in at least one of the non-charged blocks is at least 70% by moles, preferably at least 90% by moles, relative to the totality of moles of units of the said non-charged block. By hydrophilic unit is meant a monomer chosen from among those which, once homopolymerised with a degree of polymerisation of between 40 and 100, give a polymer soluble in the temperature and pH conditions of the composition. More particularly, the temperature is between 15 and 35° C.

The copolymers which have just been described are compounds well known to a person skilled in the art.

Thus, the copolymers can be prepared by using polymerisation by the anionic route, by the cationic route, by the radical route called live or controlled. It is even possible to employ, according to the monomers used, polymerisation by group transfer or even polymerisation by ring opening (in particular in the case of polymerisation from an N-carboxy anhydride ring), or by polymerisation using a transesterification of terminal groups.

Preferably, the polymers are obtained by using at least one stage of living radical polymerisation.

As examples of polymerisation processes called live or controlled, reference may be made in particular to the following:

radical polymerisation controlled by the xanthates according to the teaching of application WO 98/58974.

radical polymerisation controlled by dithioesters according to the teaching of application WO 97/01478, polymerisation using nitroxide precursors according to the teaching of application WO 99/03894, radical polymerisation controlled by dithiocarbamates according to the teaching of application WO 99/31144, radical polymerisation by atom transfer (ATRP) according to the teaching of application WO 96/30421.

In the case of polymers carrying grafts (comb polymers), they can in particular be obtained by various methods, such as for example a copolymerisation of a monomer with a macromonomer. More particularly, this method firstly uses grafting to the end of the segment of a function polymerisable by the radical route. This grafting can be carried out by usual methods of organic chemistry. Then, secondly, the thus obtained macromonomer is polymerised with the monomer chosen to form the skeleton and a polymer called a "comb" polymer is obtained.

Comb polymers can even be obtained by polymerisation of a monomer followed by grafting onto the thus obtained skeleton. The grafting of the lateral polymer segments onto a skeleton polymer segment can be carried out according to standard techniques familiar to a person skilled in the art (European Polymer Journal 4, 343 (1968) for example). Among these standard techniques, those called direct grafting can in particular be mentioned.

In the case of star type polymers, the syntheses can essentially be divided into two groups. The first corresponds to the formation of the arms of the polymers from a plurifunctional compound constituting the centre ("core-first" technique) (Kennedy, J. P. and coll. *Macromolecules*, 29, 8631 (1996), Deffieux, A. and coll. Ibid, 25, 6744, (1992), Gnanou, Y. and coll. Ibid, 31, 6748 (1998)) and the second corresponds to a method where the molecules of polymers which are going to constitute the arms are first of all synthesised and then bound together onto a core to form a polymer in the form of a star ("arm-first" technique). Among the methods which can be used to link the arms, the method comprising the reaction of these arms with a compound presenting a plurality of functional groups capable of reacting with terminal antagonistic functional groups of the said arms (Fetters, L. J. and coll. *Macromolecules*, 19, 215 (1986), Hadjichristidis, N. and coll. *Macromolecules*, 26, 2479 (1993), Roovers, J. and coll. *Macromolecules*, 26, 4324 (1993)) may in particular be cited. Let us also mention the method comprising the addition of a compound presenting a plurality of polymerisable groups, followed by the polymerisation of the said arms (Rempp, P. and coll., *Polym. Sci. Part C*, 22, 145 (1968), Fetters, L. J. and coll. *Macromolecules*, 8, 90 (1975), Higashimura and coll. Ibid, 24, 2309 (1991)).

In order to obtain the polymer chains subsequently constituting the arms of the stars, methods are generally used which make it possible to control the polymerisation reaction. In this way, live anionic and cationic polymerisation are thus the most widely used methods.

According to a particularly advantageous method of synthesis of star-shaped polymers by the "core-first" method, a stage of radical polymerisation of a composition comprising at least one cross-linking monomer, a source of free radicals, and at least one first-generation polymer is carried out.

This process has the advantage of being able to vary the number of arms and therefore the average molar masses by number of the star-form polymers by adjusting a certain number of experimental parameters amongst which are: the concentration of the reagents in the reaction medium, the proportion and chemical nature of these reagents, such as the cross-linking agent or the first-generation polymer, and the molar mass of first-generation linear polymer chains.

The first-generation polymer is obtained by a process which comprises a stage of controlled radical polymerisation of a composition comprising at least one ethylenically unsaturated monomer, a source of free radicals, and at least one control agent.

According to a variant of the process according to the invention, the obtaining of star polymers is carried out in a single stage by adding the cross-linking monomer(s) directly after the formation of the first-generation polymer, without isolating the latter, even before the end of the formation of the first-generation polymer.

Thus, more specifically, before the end of the formation of the first-generation polymer can correspond to the moment when there remains less than 30% by weight of the ethylenically unsaturated monomer introduced during the controlled radical polymerisation stage.

The cross-linking monomers can also be added to the first-generation polymer on their own or with one or more ethylenically unsaturated comonomers or with one or more other cross-linking comonomers. Moreover, the cross-linking monomers can be introduced in one go, portionwise, or added continuously or semi-continuously.

The first-generation polymers can be homopolymers, random copolymers (of two monomers or more), block copolymers (di, tri . . . ) or block copolymers where one, even more than one, of the blocks is a random copolymer.

Among the control agents which can thus be used to prepare the first-generation polymer(s), reversible addition-fragmentation agents of dithioester type of formula RSC=SR', are described in the patent applications WO 98/01478 and WO/99/35178, the RSC=SOR' xanthates, as are described in the patent applications WO 98/58974 and WO 00/75207, the dithiocarbamates of formula $RS(C=S)NR_1R_2$, such as those described in the patent applications WO 99/35177 and WO 99/31144, the thioether-thione compounds, such as those described in the patent application FR 2794464 may in particular be cited. The compounds of the xanthate family comprising phosphorous and optionally fluorine, such as those of general formula (A) described in the international application WO 01/42312, may also be cited.

The preparation process for the star polymer, like that of the first-generation polymer, is used in the majority of cases in the presence of a source of free radicals. In fact for some monomers, such as styrene, the free radicals which allow the polymerisation to be initiated can be generated by the cross-linking monomer, or the monomer with ethylenic non-saturation, itself at sufficiently high temperatures generally greater than 100° C. It is not therefore necessary, in such cases, to add a source of supplementary free radicals.

The source of free radicals is generally a radical polymerisation initiator. The radical polymerisation initiator can be chosen from among the initiators normally used in radical polymerisation, such as for example:

hydrogen peroxides such as: tert-butyl hydroperoxide, cumene hydroperoxide, t-butyl-peroxyacetate, t-butyl-peroxybenzoate, t-butylperoxyoctoate, t-butylperoxyneodecanoate, t-butylperoxyisobutarate, lauroyl peroxide, t-amylperoxypivalate, t-butylperoxypivalate, dicumyl peroxide, benzoyl peroxide, potassium persulphate, ammonium persulphate, azo compounds such as: 2-2'-azobis(isobutyronitrile), 2,2'-azobis (2-butanenitrile), 4,4'-azobis(4-pentanoic acid), 1,1'-azobis(cyclohexane-carbonitrile), 2-(t-butylazo)-2-cyanopropane, 2,2'-azobis[2-methyl-N-(1, 1)-bis (hydroxymethyl)-2-hydroxyethyl] propionamide, 2,2'-azobis(2-methyl-N-hydroxyethyl]-propionamide, 2,2'-azobis(N,N'-dimethyleneisobutyramidine)dichloride, 2,2'-azobis (2-amidinopropane) dichloride, 2,2'-azobis (N,N'-dimethylene isobutyramide), 2,2'-azobis(2-methyl-N-[1,1-bis (hydroxymethyl)-2-hydroxyethyl] propionamide), 2,2'-azobis(2-methyl-N-[1,1-bis (hydroxymethyl)ethyl] propionamide), 2,2'-azobis[2-methyl-N-(2-hydroxyethyl) propionamide], 2,2'-azobis (isobutyramide) dihydrate, -the redox systems comprising combinations such as:

the mixtures of hydrogen peroxide, alkyl, peresters, percarbonates and similar and any iron salts, titanium salts, zinc sulfoxylate formaldehyde or sodium sulfoxylate formaldehyde, and reducing sugars, the persulphates, perborate or perchlorate of alkaline metals or ammonium combined with a bisulphite of alkali metal, such as sodium metabisulphite, and reducing sugars, the persulphates of alkali metal combined with an arylphosphinic acid such as phosphonic benzene acid and other similar ones, and reducing sugars. The quantity of initiator to be used is determined in such a way that the quantity of radicals generated is at the most 50% by mol, preferably 20% at the most by mol, in comparison to the quantity of first-generation polymer or control agent.

The cross-linking monomers used are chosen from among the monomers which polymerise in the presence of active polymer chains of the first-generation polymer to give new active polymer chains the controlled radical polymerisation of which gives access to the star-shaped polymers.

More particularly, the said cross-linking monomers are chosen from among the organic compounds comprising at least two ethylenic non-saturations and at the most 10 non-saturations and known as being reactive by the radical route. Preferably, these monomers have two ethylenic non-saturations.

As an example, the (meth)acrylic, (meth)acrylamido, ester or vinyl ether, dienic, styrenic, alpha-methyl styrenic and allylic derivatives can be mentioned.

N-N'-methylenebisacrylamide, divinylbenzene and ethylene glycol diacrylate are preferred as cross-linking monomers.

The types and quantities of cross-linking monomers used vary according to the specific end-use for which the star-shaped polymer is intended. These variations are easily determined by a person skilled in the art.

Preferably, the molar ratio of cross-linking compounds relative to the first-generation polymers is greater than or equal to 1. Again preferably, this molar ratio is less than or equal to 100. In a more preferred fashion, this ratio is between 5 and 70, preferably between 5 and 20.

These cross-linking monomers can be used on their own or in a mixture.

The process according to the invention can be carried out in bulk, in solution, in emulsion, in dispersion or in suspension. Preferably, it is used in solution or in emulsion.

When it is produced in solution, in emulsion, in dispersion or in suspension, the dry extract is advantageously between 1 and 20%, and even more advantageously from 4 to 15% by weight.

The temperature can vary between ambient temperature and 150° C. depending on the nature of the cross-linking monomers used.

Generally, the process is used in the absence of a UV source, by thermal priming.

The preparation process for first-generation polymers can be used starting from a mixture of monomers with ethylenic non-saturation. In this case a random first-generation polymer is obtained. It is also possible to select hydrophilic monomers with ethylenic non-saturation, with either positive or negative charges. The star-shaped polymer obtained from this type of first-generation polymer thus has arms charged either positively or negatively.

According to a variant of the process according to the invention, subsequent to the synthesis stage of the star polymer, a new stage of controlled radical polymerisation is carried out, the conditions of implementation of which are identical to those previously described for the synthesis of the first-generation polymer, the addition of a control agent not however being necessary.

Such a preparation method is described in the French patent application FR 01 05144 filed on the Apr. 13, 2001.

According to a particular embodiment of the invention, the copolymer has charged and non-charged blocks so that for at least one of the charged blocks and for at least one of the non-charged blocks, the degree of polymerisation is at least 5, preferably at least 10.

Furthermore, at least one of the blocks of the copolymer, preferably the blocks carrying a charge, preferably has a degree of polymerisation of 5000 at most.

Moreover, for at least one of the non-charged blocks, the degree of polymerisation is more particularly at least 50, more precisely at least 500. It is usually less than or equal to $2.10^6$.

As far as the quantity of copolymer involved in the composition according to the invention is concerned, it is more particularly such that the viscosity of the composition is at least greater than three times, preferably at least greater than 10 times that of an aqueous solution of block copolymer (A) and that of an aqueous solution of type (B) in the temperature and concentration conditions of the composition.

The viscosity is measured using a Carrimed type viscosimeter, with a cone-plate geometry; the measurement is carried out at 25° C. at a shear gradient of $1\ s^{-1}$.

The molar mass in weight of copolymer (A) is advantageously greater than or equal to $10^4$ g/mol. More particularly, it is less than or equal to $10^9$ g/mol. Preferably, the molar mass in weight of copolymer (A) is between $5.10^4$ and $10^8$ g/mol.

It is to be noted that the molar masses are absolute masses by weight, which are measured by MALLS (Multiangle laser light scattering) coupled with gel permeation chromatography.

According to an advantageous embodiment of the invention, the block copolymer content is between 0.001 to 30% in weight of the composition, preferably between 0.01 and 5% in weight of the composition.

According to a variation of the present invention, the copolymer block such as has just been described, is combined with at least one diblock copolymer, carrying a block of the same charge as the charged blocks of copolymer (A) and an non-charged block.

It is to be noted that what was said above concerning the nature of the monomers of ionic and non ionic types, and equally the methods of preparing these polymers, remains valid and reference can be made thereto regarding the diblock copolymer.

When it is present, and if it is combined with a linear copolymer (A), the quantity of diblock copolymer, expressed as a percentage in weight, relative to the aforementioned sum of the aforementioned copolymer (A) and the diblock copolymer, represents 50 to 99.9%, preferably between 80 and 99% in weight.

Where the said diblock copolymer is combined with a copolymer (A) of comb, branched, or dendrimeric structure, the quantity of diblock copolymer, expressed as a percentage of weight, relative to the sum of the aforementioned copolymer (A) and the diblock copolymer, represents from 0 exclusive to 99%, advantageously from 0 exclusive to 60%.

The second constitutive element entering into the composition according to the invention is constituted by at least one ionic or polyionic type (B) of a charge opposite that of said polyionic blocks, in the pH conditions of the composition; the type being chosen from among ions carrying at least two charges, surfactants carrying at least one charge, oligomers and/or polymers carrying at least two charges, and/or mineral particles carrying at least two charges. It is specified that it is possible to use a mixture of several cationic types.

More precisely, in the following, the charge of a (poly) ionic type signifies the net charge of this type. The net charge corresponds to the difference between the number of positive charges and the number of negative charges (or conversely), knowing that in certain cases, the type can carry only a single type of charge.

When the charged blocks of the copolymer are anionic blocks, the charged type is chosen from among the cationic types, in the pH conditions of the composition.

According to a first particular embodiment of the invention, the cationic type is an ion carrying at least two charges. Preferably, the said cation is chosen from among at least one of the elements of columns IIA, IIIA, IB, IIB, IIIB, IVB, VIII of the periodic classification of the elements (published in the "Bulletin de la société chimique de France—bulletin n°1—January 1996), and rare earths.

Among the cations likely to enter into the composition according to the invention, aluminium, calcium, magnesium, barium, copper, cobalt, zinc, titanium, zirconium, iron, gallium, lanthanum, on their own or in a mixture, can be cited for example.

According to a second particular embodiment of the invention, the cationic type is chosen from among the surfactants having at least one cationic charge, in the pH conditions of the composition according to the invention.

As examples of such surfactants the following may be cited:

primary, secondary or tertiary mono- or polyamines, or those possessing one or more quaternary ammonium groups, more particularly comprising 6 to 40 carbon atoms linear or branched aliphatic, aromatic, as well as those optionally comprising one or more alcoxylated ethoxylated and/or propoxylated groups.

There may be cited as examples, hexylamine, octylamine, dodecylamine, stearylamine, hexadecylamine, oleylamine, diaminohexane, diaminoheptane, diaminododecane, benzoctamine, alkyldialkylammonium or alkyltrialkylammonium or alkylbenzyldialkylammonium halides, such as chloride, dodecyltrimethyl-ammonium bromide, chloride, hexadecyltrimethylammonium bromide, chloride, benzalkonium bromide;

piperidinium salts;

imidazoles;

heterocyclic amines; on their own or in a mixture.

It is to be noted that the scope of the present invention would not be exceeded by using, on their own or in a combination with the aforementioned surfactants, one or more amphoteric surfactants, which according to the temperature and pH conditions of the composition are in a cationic form, or can develop towards such a form. It is emphasized that an amphoteric surfactant carries an anionic charge and/or a cationic charge; its degree of ionisation varies according to the pH of the medium in which it is found.

As examples of such surfactants, there may be cited in particular betaines, such as in particular lauryl betaine (Mirataine BB from the company Rhodia Chimie); sulfobetaines: amidoalkylbetaines, such as cocoamidopropylbetaine (Mirataine BDJ from the company Rhodia Chimie); alkylampho-acetates or -diacetates, such as cocoamphoacetates and cocoamphodiacetates (Miranol C2M, Miranol Ultra C32 from the company Rhodia Chimie), alkylampho -propionates or -dipropionates, such as Miranol C2M SF of the Rhodia Chimie company, on their own or in a mixture.

According to a third particular method of embodiment of the invention, the cationic type is chosen from among the oligomers and/or polymers comprising at least two cationic charges in the pH conditions of the composition. It is to be noted that the term polymer covers both homopoiymers and copolymers, whether they are in block form or not.

Preferably, the oligomeric cationic type has a degree of polymerisation of at least 2 and preferably less than or equal to 10.

Furthermore, the polymer type has a level of polymerisation greater than 10, more particularly greater or equal to 100, preferably greater than or equal to 1000, and less than or equal to $10^9$.

All the monomers mentioned during the description of the cationic block of copolymer (A) are suitable for the type in oligomeric or polymeric form of the cationic type considered here.

In addition, the use of cationic oligomers or polymers possessing in addition one or more non-ionic units is not excluded, as soon as the polymer in question has at least two cationic charges in the pH conditions of the composition. It is to be noted that the distribution of the monomers in the oligomer or polymer can be of any type (alternate, random, block). The list of non-ionic monomers given above can be referred to.

Furthermore, it is possible to use an ampholytic oligomer or polymer, that is to say one possessing a number and a type of charge such as that of the oligomer or polymer charge is at least two positive charges, in the pH conditions of the composition.

Finally, the polymer type can be in the form of a latex, that is to say of a dispersion of polymer in water.

According to a last possibility, the cationic type can be in the form of mineral particles chosen for example from among titanium dioxide or silicon dioxide particles, treated by metal cations, such as aluminium or zinc in particular.

Preferably, these particles have an average size less than or equal to 10 $\mu$m, and preferably between 20 nm and 1 $\mu$m.

When the charged blocks of the copolymer are cationic blocks, the charged type is chosen from among the anionic types.

According to a first particular embodiment of the invention, the anionic type is an ion carrying at least two charges. Preferably, the said anion is chosen from among sulphate, carbonate and phosphate.

The scope of the present invention would not be exceeded by using an organic ion carrying several negative charges. For example the salts of saturated dicarboxylic acids having at most 6 carbon atoms, EDTA can be mentioned.

According to a second particular embodiment of the invention, the anionic type is chosen from among the surfactants with at least one anionic charge in the pH conditions of the composition according to the invention.

More particularly, the suitable anionic surfactants can be chosen from among the following surfactants, on their own or in a mixture:

alkyl ester sulphonates, alkylbenzene sulphonates, primary or secondary alkylsulphonates, alkylglycerol sulphonates, sulphonated polycarboxylic acids.

alkylsulphates, sulphates of alkylglycosides, sulphated alkyl amides, alkylphosphates, the salts of saturated or unsaturated fatty acids, paraffin sulphonates, N-acyl N-alkyltaurates, isethionates, alkylsuccinamates, N-acyl sarcosinates, alkylsulfosuccinates, monoesters or diesters of sulfosuccinates, polyethoxycarboxylates.

As more precise examples of such surfactants the following can be mentioned:

Alkylester sulphonates of formula R—CH($SO_3$M)—COOR', where R represents an alkyl radical in $C_8$–$C_{20}$, preferably in $C_{10}$–$C_{16}$. R' an alkyl radical in $C_1$–$C_6$, preferably in $C_1$–$C_3$ and M an alkaline cation (sodium, potassium, lithium), substituted or non-substituted ammonium (methyl-, dimethyl-, trimethyl-, tetramethylammonium, dimethylpiperidinium . . . ) or alcanolamine derivative (monoethanolamine, diethanolamine, triethanolamine . . . ). The methyl ester sulphonates, the R radical of which is in $C_{14}$–$C_{16}$, can quite particularly be mentioned:

the alkylsulphates of formula $ROSO_3M$, where R represents an alkyl or hydroxyalkyl radical in $C_5$–$C_{24}$, preferably in $C_{10}$–$C_{18}$, M representing a hydrogen atom or a cation with the same definition as above, as well as their ethoxylated (EO) and/or propoxylated (PO) derivatives, on average having from 0.5 to 30 units, preferably from 0.5 to 10 EO and/or PO units;

the sulphated alkylamides of formula $RCONHR'OSO_3M$ where R represents an alkyl radical in $C_2$–$C_{22}$, preferably in $C_6$–$C_{20}$, R' an alkyl radical in $C_2$–$C_3$, M representing a hydrogen atom or a cation of the same definition as above, as well as their ethoxylated (EO) and/or propoxylated (PO) derivatives, having on average from 0.5 to 60 EO and/or PO units;

the salts of saturated or unsaturated fatty acids in $C_8$–$C_{24}$, preferably in $C_{14}$–$C_{20}$, alkylbenzenesulphonates in C9–C20, primary or secondary alkylsulphonates in C8–C22, alkylglycerol sulphonates, sulphonated polycarboxylic acids, paraffin sulphonates, N-acyl N-alkyltaurates, alkylphosphates, isethionates, alkylsuccinamates, alkylsulfosuccinates, the monoesters or diesters, of N-acyl sulfosuccinate sarcosinates, the sulphates of alkylglycosides, polyethoxycarboxylates; the cation being an alkali metal (sodium, potassium, lithium), a substituted or non-substituted ammonium residue (methyl-, dimethyl-, trimethyl-, tetramethylammonium, dimethylpiperidinium . . . ) or alcanolamine derivative (monoethanolamine, diethanolamine, triethanolamine . . . ).

It is to be noted that the scope of the present invention would not be exceeded by using, on their own or combined with the aforementioned surfactants, amphoteric surfactants which depending on the temperature and pH conditions of the composition are in an anionic form, or can develop into such a form. Some aforementioned amphoteric surfactants may be suitable for this embodiment, such as for example betaines, amidoalkylbetaines; alkylamphoacetates and alkylamphodiacetates; alkylamphopropionates or alkyl amphodipropionates, on their own or in a mixture.

According to a third particular method of embodiment of the invention, the anionic type is chosen from among oligomers or polymers comprising at least two anionic charges in the pH conditions of the composition. It is to be noted that the term polymer covers both homopolymers and copolymers, whether they are in block form or not.

Preferably, the oligomeric anionic type has a degree of polymerisation of at least 2 and preferably less than or equal to 10.

Furthermore, the polymer type has a degree of polymerisation greater than 10, more particularly greater or equal to 100, preferably greater or equal to 1000, and less than or equal to $10^9$.

All the monomers mentioned during the description of the anionic block of copolymer (A) may be suitable for the type in oligomeric or polymeric form of the cationic type considered here.

In addition, the use of anionic oligomers or polymers having moreover one or more non-ionic units is not excluded, as soon as the polymer in question has at least two net anionic charges in the pH conditions of the composition. It is to be noted that the distribution of the monomers in the oligomer or polymer can be of any type (alternate, random, block). The list of non-ionic monomers given above can be referred to.

Furthermore it is possible to use an ampholytic oligomer or a polymer, that is to say one possessing a number and a type of charge so that the charge of the oligomer or polymer is at least two negative charges, in the pH conditions of the composition.

Finally, the polymer type can be found in the form of a latex, that is to say of a dispersion of polymer in water.

According to a final method of embodiment of the invention, type (B) can be chosen from among mineral particles.

As an example of such particles, the particles of titanium dioxide, silicon dioxide, cerium dioxide can in particular be mentioned.

Preferably, these particles have an average size less than or equal to 10 $\mu$m and preferably between 20 nm and 1 $\mu$m.

It is to be noted that according to a preferred method of embodiment of the invention, the molar ratio of the totality of the cationic charges to the totality of the anionic charges in the composition, is between 0.001 and 1000, preferably between 0.01 and 100, more particularly between 0.1 and 10.

Consequently, the quantity in type (B) will be calculated in such a manner as to satisfy the criterion mentioned above.

As indicated above, the composition according to the invention is an aqueous composition. Preferably, the elements constituting the composition are placed in the presence of water. However, even though it is not preferred, the scope of the present invention would not be exceeded by using a water/solvent mixture; the said solvent being chosen from among compounds miscible in water and solubilizing the block copolymer (A) and type (B). As a suitable solvent, alcohols such as methanol and ethanol can be mentioned.

According to a preferred method of embodiment of the invention, the composition comprises at least one copolymer (A) comprising, in the pH conditions of the composition, at least two anionic blocks and at least one non-charged block, with at least one cationic type, comprising, depending on its nature, one or more charges.

The composition according to the invention can be obtained by any standard means in an advantageous fashion, the various constituent elements are placed in contact, in the presence of water.

Preferably, the various constituent elements are mixed when they have been solubilized beforehand in water or optionally in a water/solvent mixture.

Contact advantageously takes place at a temperature of between 15 and 35° C.

The invention also relates to the use of the composition which has just been described, in the fields of the exploration of gas or oil deposits, detergence, cosmetics, metal working (transformation, deformation).

Finally, a last subject of the invention is constituted by formulations containing the said composition; formulations intended for the fields of the exploration of oil or gas deposits, of detergence, of cosmetics.

Concrete but non-limiting examples of the invention will now be presented.

EXAMPLE 1

The subject of this example is the obtaining of gels from star-structure block polymers.

1/Synthesis of the Star Block Polymer a) Synthesis of the Precursor Arm: $PAA_{5k}\text{-}PAM_{60k}$ It is carried out according to a batch process, at 70° C., in a double-jacketed reactor.

First Stage: $PAA_{5k}\text{-}X$ Synthesis

Acrylic acid, water, S-ethylpropionyl O-ethyl xanthate and isopropanol are introduced as a starter, with 4,4-azo-bis-4-cyanovaleric acid or ACP (50% relative to the xanthate functions). The mixture is thus heated for 6 hours to 70° C.

| Mass of the reagents introduced per 100 g of final product | | | | |
|---|---|---|---|---|
| Acrylic acid | Water | Xanthate | Isopropanol | ACP |
| 7.7 g | 16.7 g | 0.32 g | 2.5 g | 0.2158 g |

Second Stage: $PAA_{5k}\text{-}PAM_{60k}$ Synthesis

The acrylamide, dissolved in the water and the ACP (50% relative to the xanthate functions) are added to the previous mixture which is again heated for 6 hours to 70° C.

| Mass of the reagents introduced | | |
|---|---|---|
| Acrylamide | Water | ACP |
| 92.3 g | 215.8 g | 0.2158 g |

The dry extract of the final solution is 34%.

The copolymer is solubilized in a water/IPA mixture, and it is used in this form during the following stages.

b) Synthesis of the Star Polymer: $PAA_{5k}\text{-}PAM_{60k}\text{-}MBA\text{-}x$ In a flask provided with a coolant, the previously synthesized precursor arm, MBA (methylene bisacrylamide), water, isopropanol, ACP and acetone are added to the initial mixture.

The whole is heated to 80° C. for 4 hours.

| Mass of the reagents introduced | | | |
|---|---|---|---|
| $PAA_{5k}\text{-}PAM_{60k}\text{-}X$ | Water | MBA(*) | ACP(**) |
| 28.60 g | 50.54 g | 5.93 g | 0.32 g |

(*)MBA in 4% solution in a water/acetone mixture (9/1)
(**)ACP in 5% solution in acetone The dry extract of the obtained solution is 10%.

2/Formation of a Gel from a Star Structure Block Polymer

The previously obtained star structure block polymer solution is neutralised with soda (1 equivalent per acid group), then diluted with water to obtain a final dry extract of 6% in weight.

| Mass of the reagents introduced | | |
|---|---|---|
| Polymer (*) | NaOH (1mol.l$^{-1}$) | Water |
| 10.013 g | 1.102 g | 8.903 g |

(*) 12% solution of the star-shaped polymer block

This 6% solution is then mixed with an aqueous solution of cationic polymer: Glokill PQ (RHODIA product) in such a way that the molar ratio of the totality of the cationic charges to the totality of the anionic charges, $Z=[-]/[+]$ equals 1.

The solution is finally diluted with water in order to obtain a final 3% solution of star-shaped polymer.

| Mass of the reagents introduced | | |
|---|---|---|
| Polymer (*) | Glokill (**) | Water |
| 3 g | 0.277 g | 2.7 g |

(*) 3% solution of the star-shaped polymer neutralised with soda
(**) Aqueous solution of Glokill, 54.6 g/l The solution is agitated with a bar magnet. The gel forms immediately.

3/Rheolocical Analysis of the Electrostatic Gel

The thus obtained gel is analysed with the Carrimed CSL 100 apparatus.

The viscosity of the gel is 3 times greater than the viscosity of compounds on their own in the same temperature (25° C), of pH and concentration conditions (above).

The deformation stress is set at 10%, the elastic module G' and loss module G" are measured when sweeping at a frequency of 0.3 to 30 Hz. The data is listed in the table below.

| Frequency (Hz) | G'(pa) | G"(Pa) |
|---|---|---|
| 0.3001 | 141.8 | 19.8 |
| 0.3824 | 144.3 | 19.38 |
| 0.4875 | 147.1 | 19.42 |
| 0.6203 | 149.9 | 19.64 |
| 0.7906 | 152.8 | 19.95 |
| 1.007 | 155.7 | 20.36 |
| 1.282 | 158.7 | 20.79 |
| 1.641 | 161.9 | 21.27 |
| 2.09 | 165.1 | 21.73 |
| 2.654 | 168.2 | 22.26 |
| 3.391 | 171.7 | 22.75 |
| 4.329 | 175.1 | 23.34 |
| 5.499 | 178.5 | 23.87 |
| 7.016 | 182.2 | 24.37 |
| 8.91 | 185.8 | 24.82 |
| 11.41 | 191.4 | 25.12 |
| 14.53 | 195.6 | 25.61 |
| 18.5 | 200.1 | 25.26 |
| 23.48 | 204.8 | 23.59 |
| 30.14 | 209.8 | 15.96 |

What is claimed is:

1. An aqueous composition comprising:
   at least one block copolymer (A) comprising, at least two anionic blocks or at least two cationic blocks, and at least one non-ionic block, and at least one compound (B) selected from the group consisting of ions having at least two charges, surfactants carrying at least one charge, oligomers or polymers having at least two charges, and mineral particles having at least two charges, said compound being:
either cationic, as a net charge, if block copolymer (A) comprises anionic blocks,
or anionic, as a net charge, if block copolymer (A) comprises cationic blocks;
the amount of block copolymer (A) being such that the viscosity of the composition is at least greater than three times, that of an aqueous solution comprising block copolymer (A) and that of an aqueous solution comprising compound (B), in the same temperature and concentration conditions.

2. A composition according to claim 1, wherein the viscosity is at least greater than ten times that of an aqueous solution comprising block copolymer (A) and that of an aqueous solution comprising compound (B), in the same temperature and concentration conditions.

3. A composition according to claim 1, wherein it is in the form of a gel.

4. A composition according to claim 1, wherein block copolymer (A) is a linear copolymer, a copolymer having a comb structure or a star structure, a dendritic copolymer or a hyperbranched copolymer.

5. A composition according to claim 1, wherein block copolymer (A) comprises at least two anionic blocks.

6. A composition according to claim 5, wherein the anionic blocks are obtained from at least one monomer carrying at least one carboxylic, sulphonic, sulphuric, phosphonic, phosphoric, sulfosuccinic function, corresponding salts, or corresponding precursors.

7. A composition according to claim 5, wherein the anionic blocks are obtained from at least one monomer selected from the group consisting of:
linear, branched, cyclic or aromatic mono- or polycarboxylic acids, N-substituted derivatives thereof, monoesters of polycarboxylic acids, comprising at least one unsaturated ethylenic group,
linear, branched, cyclic or aromatic vinyl carboxylic acids,
amino acids comprising at least one unsaturated ethylenic group, N-carboxy anhydride amino acids,
mixtures thereof,
sulphonic or phosphonic derivatives thereof,
macromonomers derivatives thereof, and
salts or precursors thereof.

8. A composition according 1, wherein block copolymer (A) comprises at least two cationic blocks.

9. A composition according to claim 8, wherein the cationic blocks are obtained from at least one monomer selected from the group consisting of:
aminoalkyl (meth)acrylates,
aminoalkyl (meth)acrylamides;
monomers comprising at least one secondary, tertiary or quaternary amine group or a heterocyclic group containing a nitrogen atom,
vinylamine,
ethylenimine,
diallyldialkyl ammonium salts,
mixtures thereof,
their salts thereof, and
macromonomers derivatives thereof, the monomer comprising optionally a counter ion selected from the group consisting of halogens, sulphates, hydrosulphates, alkylsulphates, phosphates, citrates, formates, and acetates.

10. A composition according to claim 1, wherein the non-ionic block is obtained from at least one non-ionic monomer selected from the group consisting of:
ethylene oxide,
propylene oxide,
butylene oxide,
esters of linear, branched, cyclic or aromatic mono- or polycarboxylic acids comprising at least one unsaturated ethylenic group,
amides of linear, branched, cyclic or aromatic mono- or polycarboxylic acids comprising at least one unsaturated ethylenic group,
the $\alpha\beta$-ethylenically unsaturated nitrites,
N-vinylpyrrolidone,
vinyl ethers,
vinyl esters,
vinylaromatic monomers,
vinyl or vinylidene halides,
vinylamine amides,
hydrocarbonated monomers, linear or branched, comprising at least one carbon-carbon double bond,
mixtures thereof, and
macromonomers derivatives thereof.

11. A composition according to claim 1, wherein the non-ionic block of block copolymer (A) is water-soluble.

12. A composition according to claim 1, wherein block copolymer (A) comprises one or more non-ionic block, each non-ionic block having a weight-average molar weight being at least three times greater than that of at least one of the anionic or cationic block.

13. A composition according to claim 1, wherein the non-ionic block comprises hydrophilic units, the amount of hydrophilic units being of at least 70% by moles, relative to the totality of moles of units of the block.

14. A composition according to claim 13, wherein the amount of hydrophilic units is of at least 90% by moles.

15. A composition according to claim 1, comprising an amount of from 0.001 to 30 weight % of block copolymer (A).

16. A composition according to claim 15, wherein the amount of block copolymer (A) is of from 0.01 to 5 weight %.

17. A composition according to claim 1, further comprising at least one diblock copolymer, comprising:
an anionic or cationic block, being anionic if block copolymer (A) comprises anionic blocks, or cationic if block copolymer (A) comprises cationic blocks; and
a non-ionic block.

18. A composition according to claim 17, wherein block copolymer (A) is linear, comprising an amount of from 50 to 99.9 weight %, relative to the sum of block copolymer (A) and the diblock copolymer.

19. A composition according to claim 18, wherein the amount is of from 80 to 99 weight %.

20. A composition according to claim 17, wherein block copolymer (A) has a comb, branched, star or dendritic structure, comprising an amount of from 0, not included, to 99 weight %, relative to the sum of block copolymer (A) and the diblock copolymer.

21. A composition according to claim 20, wherein the amount is of from 0, not included, to 60 weight %.

22. A composition according to claim 1, wherein block copolymer (A) comprises anionic blocks and compound (B) is a cationic ion having at least two charges, selected from the group consisting of the elements of columns IIA, IIIA, IB, IIB, IIIB, and VIII of the periodic classification of the elements.

23. A composition according to claim 1, wherein block copolymer (A) comprises anionic blocks and compound (B) is cationic and selected from the group consisting of:
   surfactants presenting at least one cationic charge, being:
   a primary, secondary or tertiary mono- or polyamine,
   a compound comprising one or more aliphatic linear, branched or aromatic quaternary ammonium group, optionally comprising one or more alcoxylated group(s),
   a piperidinum salt,
   an imidazole,
   an heterocyclic amines, or
   a mixture thereof,
   and amphoteric surfactants being a betaine, a sulphobetaine, an alkylamphoacetate, an alkylamphodiacetate, an alkylamphopropionates, an alkylamphodipropionates, or a mixture thereof.

24. A composition according to claim 1, wherein block copolymer (A) comprises anionic blocks and compound (B) is cationic mineral particles.

25. A composition according to claim 24, wherein the cationic mineral particles are particles of titanium dioxide or silicon dioxide treated with a metal cation.

26. A composition according to claim 1, wherein block copolymer (A) comprises cationic blocks and compound (B) is an anionic ion having at least two charges, being a sulphate, carbonate, phosphate, a mixture thereof, or an organic ion.

27. A composition according to claim 26, wherein the organic ion is comprised in a salt of a saturated carboxylic acid with at most 6 carbon atoms.

28. A composition according to claim 1, wherein block copolymer (A) comprises cationic blocks and compound (B) is an anionic compound selected from the group consisting of:
   surfactants comprising at least one anionic group, being selected from the group consisting of alkylester sulphonates, alkylbenzene sulphonates, primary or secondary alkylsulphonates, sulphonate alkylglycerols, sulphonated polycarboxylic acids, akylsulphates, sulphates of alkylglycosides, sulphated alkylamides, alkylphosphates, salts of unsaturated or saturated fatty acids, paraffin sulphonates, N-acyl N-alkyltaurates, isethionates, alkylsuccinamates, N-acyl sarcosinates, alkylsulfosuccinates, monoesters or diesters of sulfosuccinates, polyethoxycarboxylates, and mixtures thereof,
   and amphoteric surfactants selected from the group consisting of betaines, alkylamphoacetates, alkylamphodiacetates, alkylamphopropionates, alkylamphodipropionates, and mixtures thereof.

29. A composition according to claim 1, wherein block copolymer (A) comprises cationic blocks and compound (B) is mineral particles of titanium dioxide, silicon dioxide, cerium dioxide.

30. A composition according to claim 1, wherein the molar ratio of the totality of the cationic charges over the totality of anionic charges, in the composition, is of between 0.001 and 1000.

31. A composition according to claim 30, wherein the molar ratio is of between 0.1 and 10.

32. A composition according to claim 1, wherein said composition is a detergent, cosmetic, oil field, or gas field composition.

* * * * *